Figure 1:
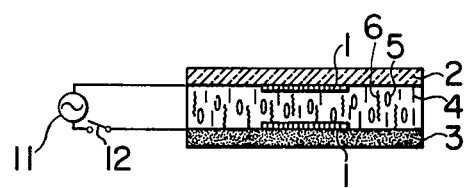

United States Patent

Moriyama et al.

[11] 4,029,392
[45] June 14, 1977

[54] LIQUID CRYSTAL DISPLAY

[75] Inventors: Akio Moriyama, Katano; Masakazu Fukai, Nishinomiya; Katsuji Hattori, Uji, all of Japan

[73] Assignee: Matsushita Electric Industrial Co., Ltd., Kadoma, Japan

[22] Filed: July 11, 1974

[21] Appl. No.: 487,672

[30] Foreign Application Priority Data

July 20, 1973 Japan .............................. 48-81723

[52] U.S. Cl. ......................... 350/160 LC; 252/299
[51] Int. Cl.² ......................................... G02F 1/13
[58] Field of Search ............................ 350/160 LC

[56] References Cited

UNITED STATES PATENTS

| | | | |
|---|---|---|---|
| 3,440,620 | 4/1969 | French | 350/160 LC X |
| 3,499,702 | 3/1970 | Goldmacher et al. | 350/160 LC X |
| 3,551,026 | 12/1970 | Heilmeier | 350/160 LC X |
| 3,647,280 | 3/1972 | Klein et al. | 350/160 LC |
| 3,731,986 | 5/1973 | Fergason | 350/160 LC X |
| 3,774,989 | 11/1973 | Takahashi | 350/160 LC |
| 3,820,875 | 6/1974 | Bohmer | 350/160 LC |
| 3,881,809 | 5/1975 | Fergason et al. | 350/160 LC |

Primary Examiner—John K. Corbin
Assistant Examiner—Matthew W. Koren
Attorney, Agent, or Firm—Stevens, Davis, Miller & Mosher

[57] ABSTRACT

A liquid crystal display comprising a glass substrate and an opaque ceramic substrate both provided with electrodes, and a nematic liquid crystal contained in the gap between the substrates, in which the orientation of the nematic liquid crystal molecules is controlled by applying an electric voltage between the electrodes to achieve colored display against the color of the ceramic substrate.

5 Claims, 2 Drawing Figures

LIQUID CRYSTAL DISPLAY

This invention relates to a liquid crystal display of the reflection type utilizing a nematic liquid crystal including a pleochroic dye.

A composition of a nematic liquid crystal including a pleochroic dye provides an industrially valuable color display capable of performing at low voltage and at low power.

Such a device can be brought into practical use in any of the transmission, the reflection and the absorption types.

This invention relates particularly to the reflection type. In reflection type devices utilizing said liquid crystal composition, such methods have conventionally been adopted as 1. disposing light scattering material, mainly of white paper, cloth, plate, powder, paint, etc., on the rear surface of a transmission type device, 2. holding in parallel a transparent plate as a front plate and a reflecting plate provided with a metallic reflecting film of aluminum, nickel, etc., as a rear plate, and disposing a liquid crystal compound in the gap therebetween.

This invention proposes a reflection type liquid crystal display device having a novel structure.

An object of the invention is to provide a liquid crystal display device comprising two spaced plates one of which is a transparent front glass plate and the other of which is an opaque ceramic rear plate, electrodes selectively disposed on the inner surfaces of said two plates, a nematic liquid crystal composition filled in the space between said two plates, and means for selectively applying an electric field across said nematic liquid crystal composition through said electrodes to thereby modulate light absorption in said liquid crystal composition when the electric field exceeds a threshold value. The ceramic rear plate is preferably white. Since a highly refractory ceramic can be selected as the ceramic rear plate, it is easy to form a transparent conductive film such as tin oxide or indium oxide, and/or a transparent insulating film such as silicon oxide, magnesium fluoride or cerium oxide by evaporation or sputtering. It is apparent that a colored ceramic plate can be used in an absorption type display device.

The co-operative alignment of nematic materials by an external electric field is used to orient pleochroic dye molecules. Pleochroic dyes are usually long cylindrically shaped molecules and have different optical absorption coefficients in parallel and perpendicular directions to their optical axes. It is desirable in achieving higher contrast in the dichroic ratio of the particular dye that the long axes of pleochroic dye molecules oriented in the nematic liquid crystal composition should be arranged in a given direction in a display cell under quiescent, non-electrical state. There are two kinds of nematic materials. One has negative dielectric anisotropy and the other has positive dielectric anisotropy and the other has positive dielectric anisotropy.

Since the dipole moment of nematic material is directed parallel to the direction of the electric vector when an appropriate electric field is applied to the nematic layer to obtain higher contrast in the dichroic ratio of the pleochroic dye, all the molecules of nematic liquid crystal composition with negative dielectric anisotropy should be nonelectrically aligned perpendicular to the surrounding surface of the display cell plates in the quiescent state and all the molecules of nematic liquid crystal composition with positive dielectric anisotropy should be non-electrically aligned parallel to the surrounding surfaces of the dislay cell plates in the quiescent state.

In the case of using a nematic liquid crystal composition including a pleochroic dye, colored monochromatic display can be achieved utilizing the absorption characteristics of the dye. When a white ceramic plate is adopted, white reflected light is obtained from the surface and a colored display based on the absorption characteristics of the dye itself can be achieved.

Particularly, since said ceramic plate is in direct contact with the liquid crystal layer, parallax can be eliminated from the pattern image under the application of an electric field. In the cases when the occupation area of a display should be small as in a digital type electronic wrist watch, this invention does not need any external means, can achieve a compact display, and enables one to simplify the manufacturing steps.

This invention cannot be applied effectively in the case when the liquid crystal composition to be used is a composition not dyed. The liquid crystal composition including a pleochroic dye may be either one causing orientation change in an electric field or one causing dynamic scattering in an electric field.

Figure 2:
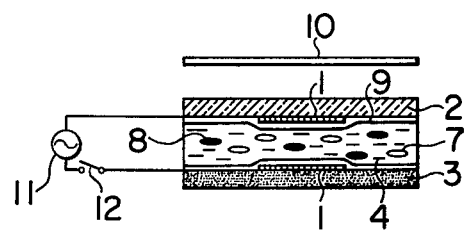

The above and other objects, features and advantages of the present invention will be apparent from the following description taken in conjunction with the accompanying drawing, in which:

FIG. 1 is a cross-section of a liquid crystal display device according to an embodiment of this invention; and FIG. 2 is a cross-section of a liquid crystal display device according to another embodiment of this invention.

EMBODIMENT 1

As shown in FIG. 1, a transparent glass plate 2 and a white and opaque ceramic plate 3 both provided with indium oxide transparent electrodes 1 were held in parallel to each other and a liquid crystal composition as described below was inserted in the gap therebetween. Namely, the liquid crystal composition consists of a nematic liquid crystal composition of equal weight percent mixture of p-anisylidene-p'-n-heptylaniline, p-ethoxybenzylidene-p'-n-butylaniline, and p-n-propoxybenzylidene-p'-n-pentylaniline, 2 weight percent of commercially available surfactant Nonion LP-20R (trade name of Nippon Yushi Co., Japan, offered from January, 1973 for sarbitan monolaurate) and one weight percent of black dye Solvent Black 3 represented by

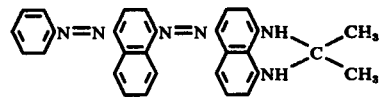

This composition exhibits negative dielectric anisotropy.

Here, the surfactant Nonion LP-20R is an additive 6 having a function of forming a perpendicularly aligned phase in a liquid crystal layer. The additive 6 is effectively added in the liquid crystal composition in an amount of 0.5 to 10 percent by weight. If the addition exceeds 10 percent by weight, the time constant of the liquid crystal composition is increased so that the response becomes unfavourable. The black dye Solvent Black 3 is an example of pleochroic dyes. By the effect of the additive 6, the molecular axes of the liquid crystal molecules 4 and dye molecules 5 were arranged perpendicular to the surrounding walls in a larger area. The liquid crystal cell obtained in the above manner was colorless in the absence of an electric field. Namely, due to the reflection on a white ceramic rear plate, the display surface appeared white. When an electric field was applied, the liquid crystal cell became colored to appear black due to the orientation change of the absorption axis of the dye molecules. When an electric field of such voltage and frequency which did not cause dynamic scattering was applied, the liquid crystal cell was colored black in a transparent state. When an electric field of such voltage and frequency which caused dynamic scattering was applied, the liquid crystal cell was colored black in an emulsion state.

Since the rear plate consists of a white ceramic plate, there is little light absorption in the reflection by this surface and color display based only on the used dye can be made.

EMBODIMENT 2

As shown in FIG. 2, indium oxide transparent electrodes 1 for achieving display were provided on the surfaces of a transparent glass plate 2 and a white and opaque ceramic plate 3 and cerium oxide insulating films 9 were disposed on the whole surfaces of these plates 2 and 3. Each of these plates was polished with diamond paste in a single direction on their surface. The transparent glass plate 2 and the white and opaque ceramic plate 3 were disposed in such a manner that the polishing directions on the respective cerium oxide insulating films 9 were substantially parallel to form a cell having a gap of about 10 microns. In the gap of the cell, a liquid crystal composition was filled which included equal weight percent mixture of p-anisylidene-p'-n-heptylaniline, p-ethoxybenzylidene-p'-n-butylaniline, and p-n-propoxybenzylinene-p'-n-pentylaniline, 10 weight percent of p-nitrobenzylidene-p'-aminotoluene, and 2 weight percent of a violet dye AIZEN SPILON VIOLET RH Special (trade name of HODOGAYA Co. offered from Aug., 1972 and giving a color corresponding to C.I. Solvent Violet 21 ). Here, p-nitrobenzylidene-p'aminotoluene is an additive 7 with positive dielectric anisotropy, being capable of dissolving larger quantities in the liquid crystal composition, and having a function capable of cooperatively causing rotational reorientation of liquid crystal molecules under the application of an electric field and exhibiting yellow. The additive 7 can be effectively added in the liquid crystal composition to the extent of 20 percent by weight at a room temperature. If the addition of the additive 7 exceeds this percentage, the liquid crystal composition comes to change to a solid state. The violet dye AIZEN SPILON VIOLET RH Special (trade name of a product of HODOGAYA Co.) is a kind of pleochroic dye and has such a property that when the molecules are orientated cooperatively with liquid crystal molecules, absorption maximum in the visible range lies near the direction along the longitudinal axis of the liquid crystal molecules.

The liquid crystal cell exhibited yellow in the absence of an electric field. When a voltage above a threshold value was applied, that portion applied with the electric field was colored violet. The ceramic plate used as the rear plate in a reflection type display worked effectively in display. Here, in FIG. 2, numeral 8 indicated dye molecules.

When a sheet of linear polarizer 10 was disposed in front of the front plate of this device with the polarization plane perpendicular to the polishing direction of the plates of this device, the contrast of this device could be enhanced.

Although, in the embodiment I and II, particular percentages are selected for the pleochroic dyes, such percentages are only for examples. Usually, concentration of a pleochroic dye in the nematic material is effectively selected in an amount of 0.5 to 5 percent by weight. The optimum concentration of the pleochroic dye is 0.5 to 2 percent by weight.

As has been described above, according to the arrangement of the present liquid crystal display device, basic display functions as a colored display can be well achieved in a reflection type nematic liquid crystal display including a pleochroic dye. In small size application instruments such as a time display in a digital indication electronic type wrist watch, there is no need to utilize any member except the substrate and the structure can be made compact. Further, simplification of manufacturing steps can be done.

What we claim is:

1. A liquid crystal display device comprising two spaced plates one of which is a transparent front glass plate and the other of which is a white opaque ceramic rear plate, electrodes selectively disposed on the inner surfaces by said two plates, a nematic liquid crystal composition containing a pleochroic dye filled in the space between said two plates, and means for selectively applying an electric field across said nematic liquid crystal composition through said electrodes to thereby modulate light absorption in said liquid crystal composition when the electric field exceeds a threshold value.

2. A liquid crystal display device as set forth in claim 1, wherein said nematic liquid crystal composition has a negative dielectric anisotropy with all the molecules being nonelectrically aligned perpendicular to the surfaces of said plates in the quiescent state.

3. A liquid crystal display device as set forth in claim 2, wherein said nematic composition comprises
   1. 85 to 99 weight percent of a mixture consisting of equal weight percent of p-anisylidene-p'-n-heptylaniline, p-ethoxybenzylidene-p'-n-butylaniline and p-n-propoxybenzylidene-p'-n-pentylaniline,
   2. 0.5 to 10 weight percent of sorbitan monolaurate,
   3. 0.5 to 5 weight percent of Solvent Black 3 represented by the formula

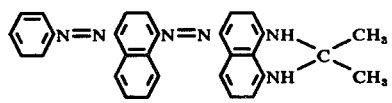

4. A liquid crystal display device as set forth in claim 1, wherein said nematic liquid crystal composition has a positive dielectric anisotropy with all the molecules being noneelectrically aligned parallel to the surfaces of said plates in a predetermined direction in the quiescent state.

5. A liquid crystal display device as set forth in claim 4, wherein said nematic composition comprises 1. 75 to 98 weight percent of a mixture consisting of equal weight percent of p-anisylidene-p'-n-heptylaniline, p-ethoxybenzylidene-p'-n-butylaniline and p-n-propoxybenzylidene-p'-n-pentylaniline, 2. 1.5 to 20 weight percent of p-nitrobenzylidene-p'-aminotoluene, and 3. 0.5 to 5 weight percent of a dye giving a color corresponding to C.I. Solvent Violet 21.

* * * * *